Figure 1:
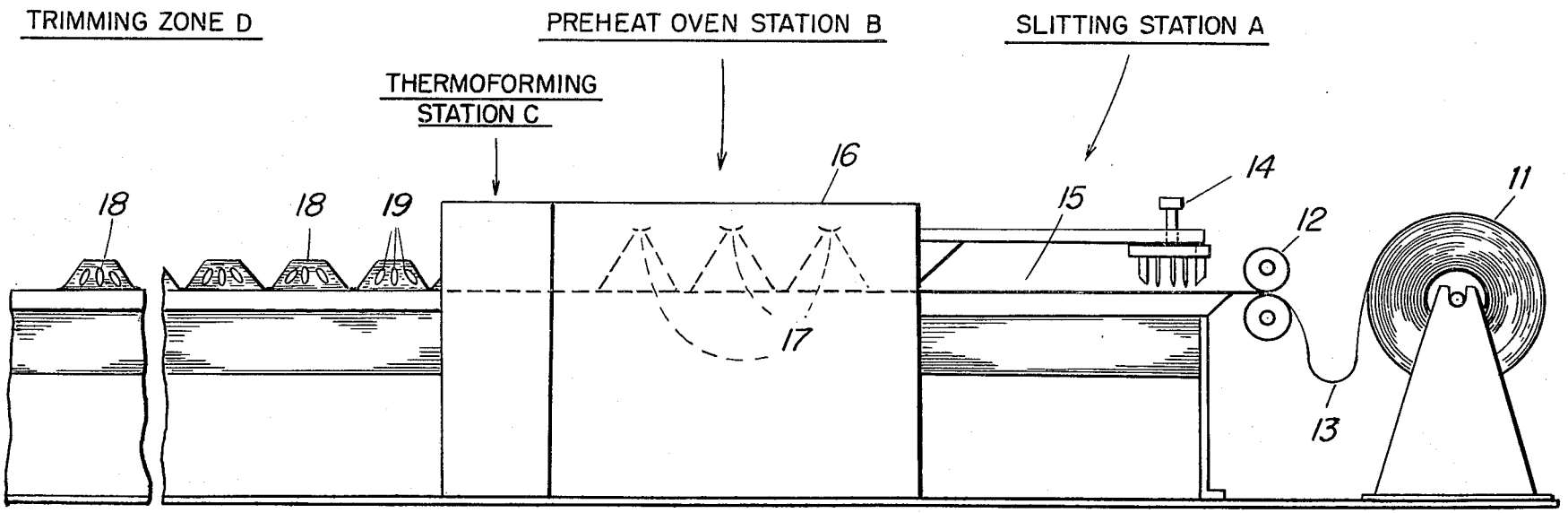
Figure 2:
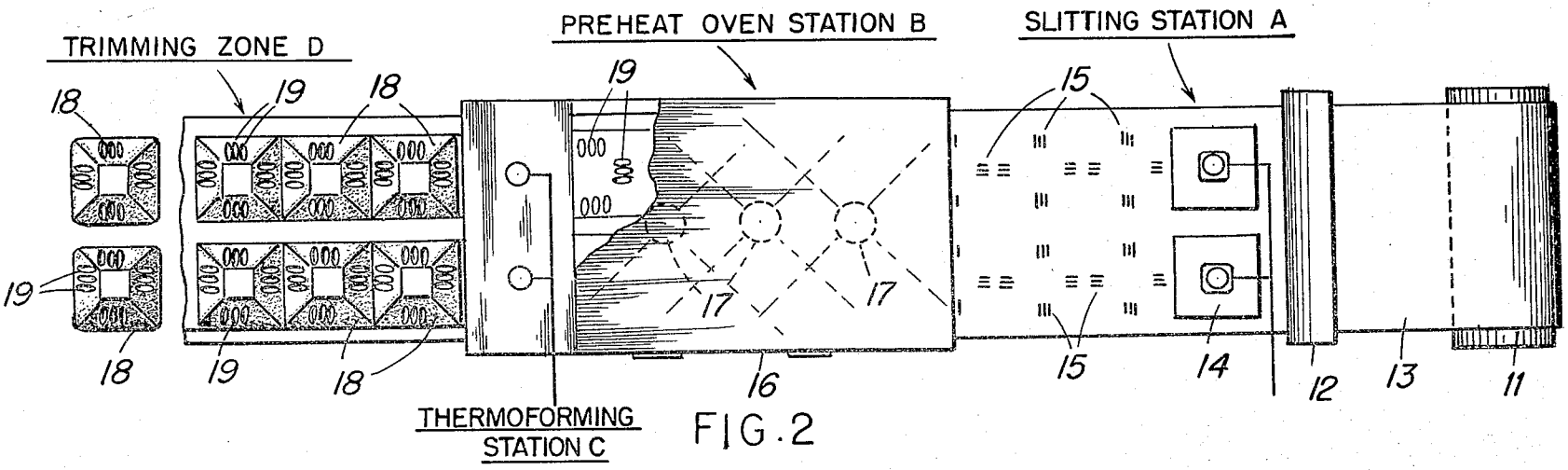
Figure 3:
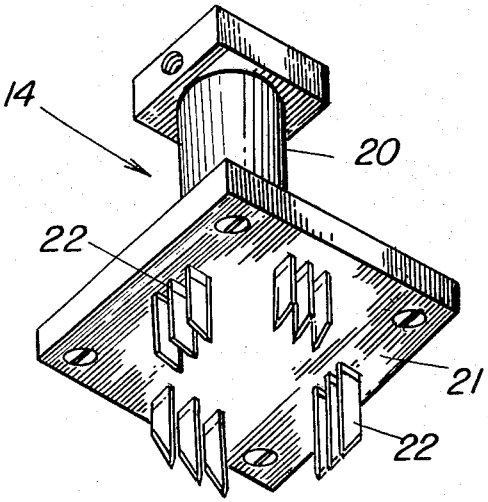
Figure 4:
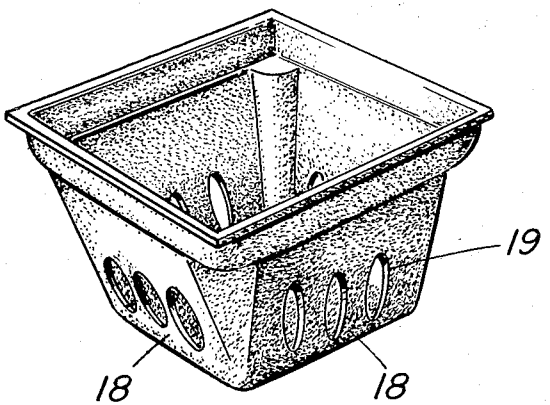
Figure 6:
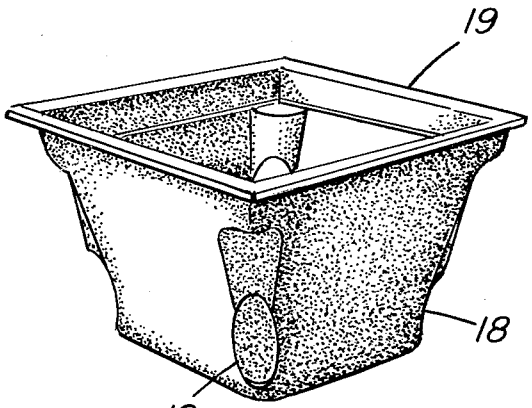
Figure 7:
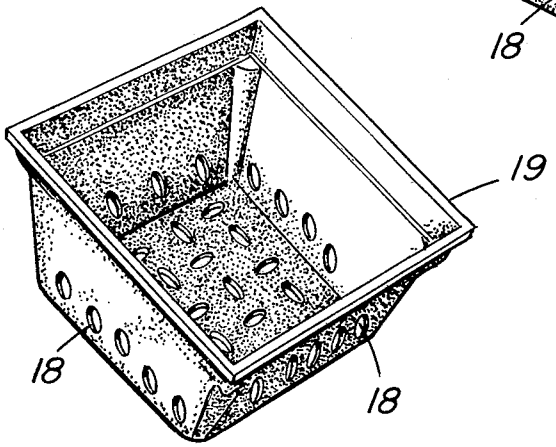
Figure 5:
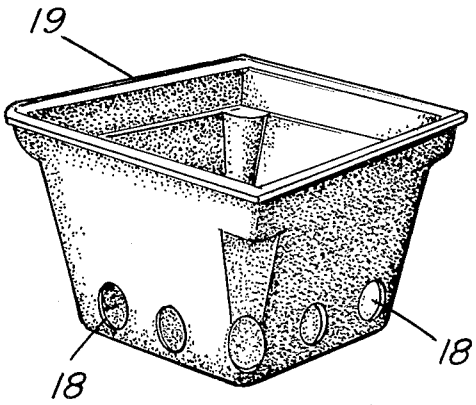
Figure 8:
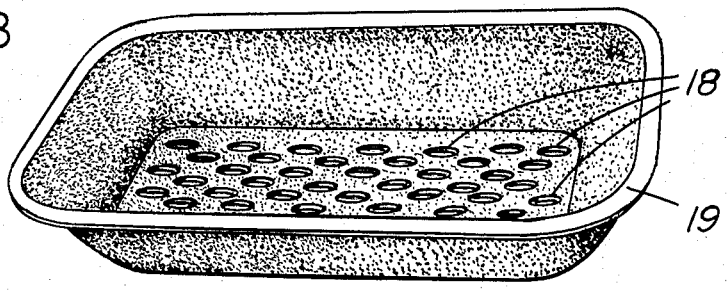
Figure 8:
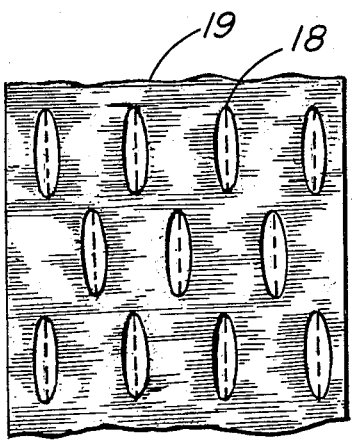
Figure 8:
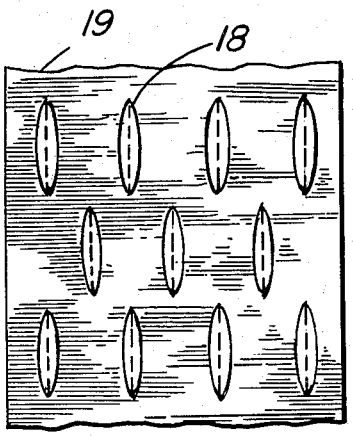
Figure 8:
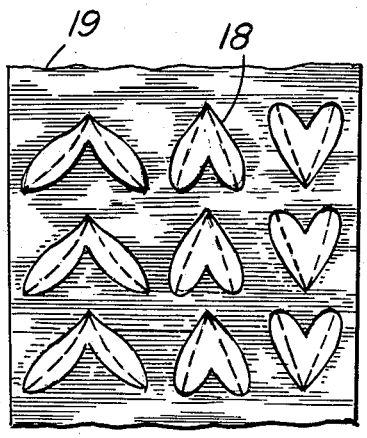
Figure 8:
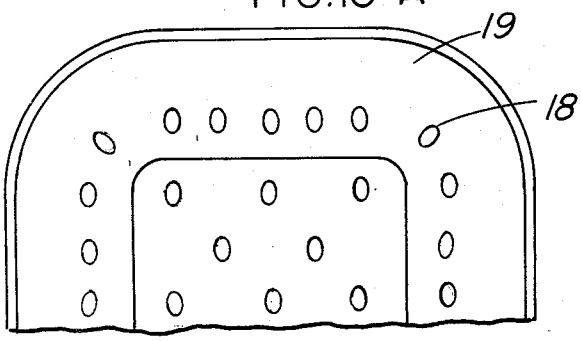
Figure 8:
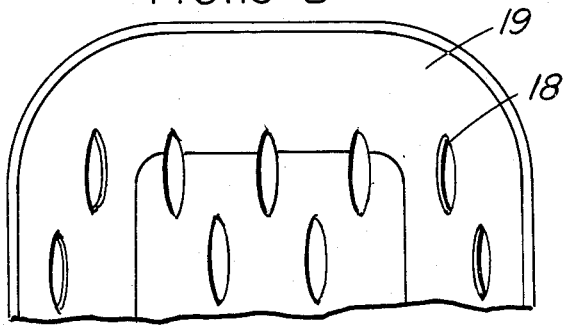
Figure 8:
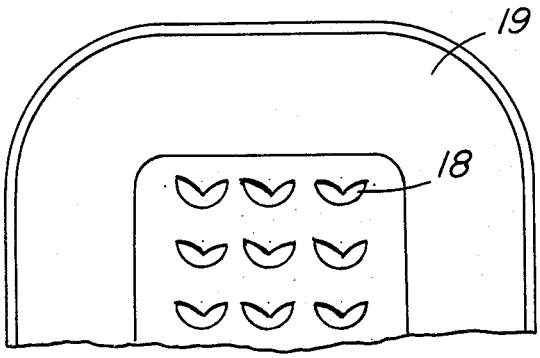
Figure 8:
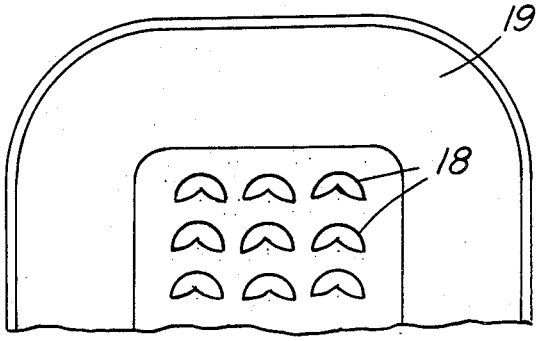

United States Defensive Publication [19] (H) [11] T102,302

Commisso [43] Oct. 5, 1982

[54] METHOD FOR THE PRODUCTION OF APERTURES IN POLYSTYRENE FOAM SHEET

[76] Inventor: Nicholas D. Commisso, 19 Dryer Ave., Victor, N.Y. 14564

[21] Appl. No.: 298,709

[22] Filed: Sep. 2, 1981

Related U.S. Application Data

[63] Continuation of Ser. No. 88,788, Oct. 29, 1979, abandoned, which is a continuation of Ser. No. 951,547, Oct. 16, 1978, abandoned, which is a continuation of Ser. No. 829,126, Aug. 30, 1977, abandoned, which is a continuation of Ser. No. 633,777, Nov. 20, 1975, abandoned.

[51] Int. Cl.[3] ..... B12B 1/48

[52] U.S. Cl. ..... 264/154

[57] ABSTRACT

A method and apparatus for producing apertures such as ventilation holes and the like in a preformed sheet of polystyrene foam which comprises forming slits which extend completely through the foam structure, the slits being arranged in a predetermined pattern, and passing the preslit foam through a heating zone such as a preheat oven used in plastic thermoforming operations. The resultant heated sheet of foam, as it emerges from the oven, is characterized by having a plurality of openings or apertures in locations corresponding to the slits which were made in the foam prior to preheating. The aperture containing sheets may be subsequently subjected to a thermoforming operation whereby thermoformed objects such as produce containers are produced having ventilation openings, i.e. apertures, located in a predetermined disposition around the thermoformed tray structure.

5 Claims, 4 Sheets Drawing,

17 Pages Specification

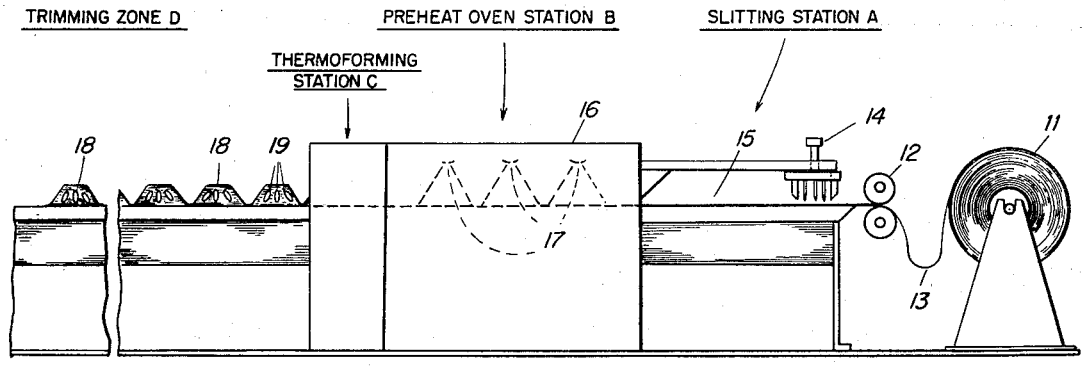

The file of this unexamined application may be inspected and copies thereof may be purchased (849 O.G. 1221, Apr. 9, 1968).